(12) United States Patent
Berkovitz

(10) Patent No.: US 8,389,843 B2
(45) Date of Patent: Mar. 5, 2013

(54) INTERACTIVE MUSIC NOTATION LAYOUT AND EDITING SYSTEM

(75) Inventor: Joseph H. Berkovitz, Cambridge, MA (US)

(73) Assignee: NoteFlight, LLC, Cambridge, MA (US)

( * ) Notice: Subject to any disclaimer, the term of this patent is extended or adjusted under 35 U.S.C. 154(b) by 186 days.

(21) Appl. No.: 13/004,709

(22) Filed: Jan. 11, 2011

(65) Prior Publication Data

US 2011/0167988 A1  Jul. 14, 2011

Related U.S. Application Data

(60) Provisional application No. 61/294,261, filed on Jan. 12, 2010.

(51) Int. Cl.
  *G10H 7/00* (2006.01)
(52) U.S. Cl. .................. 84/602; 84/477 R; 84/478
(58) Field of Classification Search .......... 84/600–602
  See application file for complete search history.

(56) References Cited

U.S. PATENT DOCUMENTS

| | | | |
|---|---|---|---|
| 6,235,979 B1 | 5/2001 | Yanase | |
| 7,119,266 B1* | 10/2006 | Bittner et al. | 84/477 R |
| 7,220,909 B2* | 5/2007 | Funaki | 84/609 |
| 7,309,826 B2 | 12/2007 | Morley et al. | |
| 7,365,261 B2 | 4/2008 | Hirano | |
| 7,439,441 B2* | 10/2008 | Jarrett et al. | 84/603 |
| 7,612,278 B2* | 11/2009 | Sitrick et al. | 84/609 |
| 7,703,014 B2 | 4/2010 | Funaki | |
| 7,728,212 B2 | 6/2010 | Fujishima | |
| 8,010,892 B2* | 8/2011 | Audet | 715/243 |
| 2004/0112201 A1 | 6/2004 | Funaki | |
| 2006/0065100 A1* | 3/2006 | Funaki | 84/471 R |
| 2009/0013855 A1 | 1/2009 | Fujishima et al. | |
| 2010/0263517 A1* | 10/2010 | Robledo | 84/483.2 |
| 2011/0120288 A1* | 5/2011 | Bignell et al. | 84/483.1 |

OTHER PUBLICATIONS

International Search Report for International Application PCT/US2011/020857, dated Mar. 15, 2011.

* cited by examiner

*Primary Examiner* — Jeffrey Donels
(74) *Attorney, Agent, or Firm* — Morse, Barnes-Brown & Pendleton, P.C.; Sean D. Detweiler, Esq.

(57) ABSTRACT

A system and method for positioning, on an electronic display, an additional musical symbol based on the location of one or more existing musical symbols can include determining one or more positional constraints on the additional musical symbol. The one or more positional constraints can include one or more preferred quantities. Each of the one or more positional constraints can be automatically defined as being either a time-based positional constraint or a space-based positional constraint. The additional symbol can be positioned in a measure of a staff at a distance away from one of the one or more existing musical symbols. The distance can be at least in part determined by at least one of the one or more preferred quantities.

19 Claims, 8 Drawing Sheets

INTERACTIVE MUSIC NOTATION LAYOUT AND EDITING SYSTEM

RELATED APPLICATION

This application claims priority to, and the benefit of, U.S. Provisional Application No. 61/294,261, filed Jan. 12, 2010, for all subject matter common to both applications. The disclosure of said provisional application is hereby incorporated by reference in its entirety.

FIELD OF THE INVENTION

The present invention relates to a wide variety of methods for the digital presentation and editing of notated music, including but not limited to conventional music notation, guitar tablature, piano-roll notation and other graphical paradigms for representing compositional intent.

BACKGROUND OF THE INVENTION

Most musical cultures that use a notational system possess a complex set of conventions and rules governing the choice and visual arrangement of symbols in that system. Some of these rules concern how musical meaning is represented by the choice and placement of the symbols; other conventions are more visual and typographical in nature and dictate how a well-formed notational document should or should not appear, to maximize clarity, uniformity, and readability.

FIG. 1 is an excerpt from a typical example of conventionally notated Western music, a print edition of a Beethoven sonatina. It illustrates some of the common units of organization in music notation and their key visual relationships.

The musical piece shown in FIG. 1 is to be read from left to right, and from top to bottom. This direction represents the flow of metric time of the musical piece. Each horizontal run or block of music 101 that is organized in a left-to-right fashion is herein referred to as a "system." Conventionally, a system 101 extends the entire width of the page and is horizontally divided into discrete measures 102. A measure, as understood by one possessing skill in the art, is a metrical unit of organization within many forms of music. Each system 101 is also vertically subdivided into one or more staves 103, where each staff represents an individual voice or instrumental part. A measure thus intersects a portion of each staff in the system in which it occurs. A measure's constituent symbols such as symbols 104 are, by convention, positioned such that any set of symbols representing musical events with simultaneous onset times 105 are in vertical alignment. In such a scenario where two or more symbols represent musical events having simultaneous onset times, this is herein referred to as "temporal simultaneity." A large number of other complex conventions also govern the relative and absolute positioning of musical symbols. Such conventions are well known in the art and therefore need not be described in further detail herein. Furthermore, such conventions are dictated by the particular paradigms or systems of musical notation. Western notation, as discussed herein, is only one of a wide variety of such systems.

While the underlying musical meaning of notation is generally understood by composers and performers, the positional and typographical details of well-formed music notation are difficult to grasp and to manually execute, due to their complexity and obscurity. It is thus very useful for creators of musical documents to employ a software application to automatically place and render the musical symbols in the document, and to interactively edit the document in such a fashion that the placement and rendering of the symbols are updated immediately and automatically following each change to the particular notes, note durations or rhythms, number of measures, number of staves, and the like. Such computer applications are commonly known as music notation editors. They are analogous to a word processing application in that both deal with positioning and rendering a large number of glyphs in conjunction with interactive editing. In the context of music notation, however, the need for such an automated program is even greater, due to the positional complexity and non-linearity of musical notation, as well as the importance of appropriate positioning and rendering of symbols. Reflecting temporal simultaneity in notated music is a challenge of particular importance within this landscape.

Computer software for creating and processing music notation has existed for several decades. However, current notation editors often suffer from at least one of several key shortcomings.

Algorithms for automatically arranging and displaying musical symbols are often computationally expensive, meaning they tend to occupy a large amount of an operating machine's CPU. Consequently, the software or application running such algorithms must be optimized for a particular operating system or hardware platform in order to maximize speed. Thus, native applications running such algorithms are ill-suited for operation in a lightweight environment such as a virtual machine runtime or web browser. Computation in the abovementioned environments is slower and a complex algorithm negatively impacts the responsiveness of the program's user interface.

In addition, many approaches for the automatic arrangement of musical symbols require recalculation of large portions of the music's layout, even after a small change is made. In many instances, a minor notational adjustment to a single measure can initiate the recalculation of an entire page or pages of surrounding music. This results in similar runtime-related drawbacks as those mentioned above, which more directly affect music editing as opposed to music rendering alone.

Further, the extreme complexity of music layout results in many existing programs exhibiting limitations and errors in their rendering of conventional music notation. Such programs can either altogether fail to render musical symbols in a musically logical and correct manner, or can fail to place such symbols in locations that are convenient and appropriate for viewing or reading.

SUMMARY

There remains a need for an interactive music notation layout and editing system that is conceptually simpler and more modular in nature, relative to existing systems, and which results in fewer limitations and higher software quality. The present invention is directed toward further solutions to address these and other needs in the art, in addition to having other desirable characteristics.

In accordance with one example embodiment, the present invention provides an efficient and simple means for automatic determination of correct musical layout, designed to minimize computational effort when processing small, incremental changes to the content or to the display format of the document. Additionally, computational effort can be maintained at a reasonable level during the initial processing of an entire musical document.

Small, incremental changes are the most frequently encountered type of edits made by users of music notation editors. A program's responsiveness to such changes is a primary factor in its usability. Existing rendering systems designed for sheet music distribution tend to focus on whole-document processing, resulting in software designs that perform sub-optimally with respect to small changes, or are not able to handle changes without a complete rebuild of the entire document layout. The present invention additionally is directed toward further solutions to address this problem in the art.

For clarity and simplicity, the following description makes use of terms associated with conventional Western music notation. However, the present invention is in no way limited to one specific type or system of notation. One of skill in the art, upon reading the present specification, will appreciate that the present invention can be implemented in many other forms of notation and notational systems, as well as other notational conventions within those systems, and is therefore not limited to the Western notation and its conventions, as characterized herein.

Some embodiments of the present invention can implement an example data structure known as a directed acyclic graph to represent and organize the positional constraints between musical symbols. A directed acyclic graph consists of a set of nodes and a set of unidirectional arcs connecting nodes to other nodes, and is further accompanied by the restriction that the graph may not contain any subgraph in which the nodes and arcs form a cycle. Nodes can be used to represent positional constraints dictated by the rules of a particular notational system or paradigm.

Thus, when referring to embodiments involving directed acyclic graphs, "determining" one or more positional constraints on a symbol is used herein to refer to processes such as creating one or more new nodes, adjusting one or more existing nodes, giving one or more nodes a particular designation (e.g. max, min, sum), and other determination processes. More broadly, outside of the explicit context of directed acyclic graphs, "determining" encompasses any process enabled herein, as appreciated by one with skill in the art, and involving establishing or adjusting positional constraints in a manner that allows for the manipulation of the imposed or preferred quantities.

Each node in such an example graph can include a geometric vector or displacement from one point in the notation layout to another point. The vector at a given node is either 1) an explicit, "ideal" displacement in the musical layout that depends on nothing else, or 2) a numerical function of the vectors associated with the target nodes to which the given node's arcs are directed. The example graph is constructed such that vectors at certain nodes, construed relative to a known point in the layout, such as the beginning of a measure, represent the position of a single musical symbol. The evaluation of the vector at any node requires only a simple traversal of a subgraph reachable from that node along the transitive closure of outgoing arcs. To evaluate the vector at some node of interest, evaluation of vectors at the adjacent nodes directly reachable from the node of interest must first occur. Evaluating the vectors at the adjacent nodes in turn may require evaluating yet other nodes reachable from the adjacent nodes. This recursive process "fans out" to visit some portion of the nodes in the graph, but eventually the process terminates when all nodes that are indirectly reachable from the primary node have been visited. The lack of cycles in the graph prevents this process from becoming trapped in an infinite loop that never terminates. Caching of vectors within nodes provides a further optimization of the performance of this approach, since it allows subgraph traversal to terminate at any node possessing an already-cached vector. Such caching features can be implemented by caches and other user/document history databases, as understood by one having skill in the art.

One illustrative embodiment of the present invention implements an example graph representation of constraints since such a representation can be particularly flexible and efficient. The node for a note's position can be expressed in terms of time-separated symbols and space-separated symbols. "Time-separated" symbols are herein defined to be symbols that have a preferred distance of separation that is based on the temporal occurrence of the music events represented by the symbols. Said differently, the preferred distance between time-separated symbols represents temporal content, such as a temporal quantity or quality. Two symbols that are "time-separated" thus represent two non-temporally simultaneous musical events. "Space-separated symbols," on the other hand, refer to symbols that have a preferred distance of separation that is not based on the temporal occurrence of the musical events represented by the symbols. Said differently, the preferred distance between "space-separated" symbols represents one or more purely visual and/or notational conventions and considerations, which are altogether unrelated to temporal content.

Thus, a broader distinction can be drawn between "time-based" and "space-based" positional constraints and requirements. In particular, time-based positional constraints and requirements specify a preferred distance of separation that represents temporal content. Space-based positional constraints and requirements specify a preferred distance of separation that does not represent any temporal content. Temporal content can include the occurrence of a musical event in time, temporal simultaneity/non-simultaneity, a duration of time that a symbol occupies, and other temporal content. As one example of this distinction, consider two adjacent eighth notes in a measure, neither of which is a grace note. These two notes are time-separated since they represent temporally distinct and non-simultaneous musical events. On the other hand, consider an accidental that precedes and defines a quarter note. The two symbols (e.g., the accidental and the quarter note) are space-separated since the preferred distance between the accidental and the quarter note has nothing to do with temporal content.

Given this distinction, constraints can be defined as being either time-based or space-based. In an illustrative embodiment positional constraints are defined by being represented as nodes on a graph and placed in a time-based or a space-based portion of the graph. Other embodiments for defining a constraint as being either time-based or space-based are possible and contemplated within the scope of the invention. According to embodiments of the present invention, this process of defining positional constraints can be automatic upon the positioning or repositioning of a musical symbol, and can be pre-programmed based on many factors that are specific to a particular musical notation paradigm. The many factors can include, for example, the type of symbol being placed, the scenario in which the symbol is found, the placement of the symbol temporally (e.g. the first symbol in a measure or the last symbol in a measure), the desired amount of visual padding for the symbol, whether the symbol represents temporal content, whether the symbol does not represent temporal content, the presence or location of other symbols, and many other factors based on the type of or scenario in which a symbol can be found.

In accordance with further aspects of the present invention, embodiments employing such example constraint graphs can include node vectors that are expressed as minima, maxima or sums of other node vectors. In such embodiments, complex derivations can correctly express the subtle visual relationships between symbols in music notation as dictated by the rules of a particular notational system or paradigm. Thus, the web of relationships in the overall constraint graph drives the music layout, rather than a collection of atomic time segments within the music. In such embodiments, the nodes represent positioning constraints and the resulting evaluated vectors represent the position of musical symbols.

In accordance with aspects of the present invention, preferred distances between two musical symbols (e.g. mathematical representations of positional requirements) can be represented by nodes. Furthermore, a node can perform an evaluation based on input data from other nodes to yield a resulting quantity of distance or vector. Generally, a given node receives input data from each additional node to which it is connected. The given node can be connected to multiple other nodes that provide input data. Nodes providing input data to another node can be referred to as "input nodes," within the specific context of that relationship. More specifically, the input data provided by an input node includes or specifies a preferred distance of separation between two connected nodes. The distance or separation can be represented by a vector. Notably, nodes can be distinguished based on whether the preferred distance of separation is time-based or space-based, as defined herein.

In example embodiments according to the present invention, one or more directed acyclic graphs can be segregated into two distinct portions, each of which is herein referred to as a "subgraph." The distinct sub-portions can be based on whether the preferred distances of separation of the nodes contained therein are time-based or space-based. As such, the subgraphs can be labeled as a "time-based positional constraint subgraph" and a "space-based positional constraint subgraph," according to example embodiments of the present invention. Or more simply, the subgraphs can be referred to as a "time-based constraint subgraph" and a "space-based constraint subgraph."

According to further aspects of the present invention, the particular manner in which a node evaluates data from its one or more input nodes can depend on a specific designation that is given to the node. In example embodiments, each output node can be designated as a maximum node, minimum node, or a sum node. A maximum node receives the preferred distance specified by each of its one or more input nodes (i.e., its "input distances"), evaluates these distances, and returns the maximum value of these distances. A minimum node evaluates its input distances and subsequently returns the minimum value of these distances. A sum node evaluates the preferred distance of one of its input nodes, and adds one or more additional distances to this preferred distance. The one or more additional distances are determined by the remaining one or more input nodes. Every node in an example directed acyclic graph can be given one such designation or label (e.g., max, min, or sum).

In accordance with aspects of the invention, the particular positional requirements and constraints imposed upon a musical symbol can be assigned as being "time-based" or "space-based," as previously defined herein. A "positional requirement" is defined herein to be a notational convention that dictates the position that a symbol should have relative to one or more additional symbols. Positional requirements, as understood in view of the description provided herein, thus are imposed by the presence and/or position of other musical symbols within the same electronic document. A "positional constraint," on the other hand, is herein defined to be a particular mathematical representation of a quantity, distance, vector, position, or other representation of a symbol's placement on a page, on a display, or in a document, which is determined by one or more positional requirements. Positional constraints are imposed on an additional symbol and are based at least in part on the location and/or presence of one or more existing symbols in an electronic document containing a plurality of musical symbols. One of skill in the art thus will appreciate that positional requirements are the rules and conventions (i.e. abstract concepts) of a notational system, while positional constraints are the numerical, mathematical, and/or data structure representations of where or how to place a symbol. Given that positional constraints represent musical concepts by one or more values, positional constraints can implement the rules of notation in a broad range of embodiments. Example directed acyclic graphs, described in detail herein, comprise only one mathematical model of many possible models for separating positioning requirements into a time-based category and a space-based category. Such alternative implementations and embodiments can be appreciated by one of skill in the art and thus are not described in further detail herein. However, all such embodiments are contemplated by the present invention.

For purposes of further illustration, several concrete examples of space-based positional constraints are provided, all taken from Western notation. A first example is the scenario of having two notes that represent two subsequent eighth notes in a single measure within a single staff. While separating each of the two notes by a sufficient distance to indicate that they occupy two distinct positions is a time-based positional requirement, there is an additional requirement that the two distinct positions cannot be so close as to cause overlap of the two note heads. This additional requirement for a minimum distance between the two note heads in order to prevent their visual overlap is a space-based positional constraint. Prevention of visual overlap of two symbols occupying distinct positions is entirely unrelated to temporal content or time-based considerations. Thus, requirements dictating such prevention can be expressed as space-based positional constraints.

An additional, different example from Western notation is the example of a text box, a textual direction, or another text string, e.g. "staccato," being placed above a note. Notation conventions dictate that the text should occupy the same horizontal position along the staff as the note in order to indicate properly that the note is to be played staccato. This requirement is expressed as a space-based constraint. A textual instruction is not in itself a musical event, as indicated by the fact that the instruction "staccato" is meaningless in Western notation unless it is accompanied by one or more corresponding notes. The text "staccato" acts much like an accidental; both symbols further define or characterize a musical event. Thus, the preferred separation of a textual instruction from a note does not convey temporal content (such as the passing of time or the simultaneity of two musical events). Accordingly, the placement of a textual instruction within the same horizontal position along a staff is a further example of a space-based positional constraint.

A final example from Western notation illustrating a space-based positional constraint is the scenario of placing a first note in a measure to the right of the preceding bar line. Notational conventions dictate that the first note should be a preferred distance away from the preceding bar line. As with the other examples provided herein, placement of the first note in a measure at a preferred distance away from the preceding bar line is entirely unrelated to temporal content since the preferred spacing does not represent passage of time, temporal simultaneity, or any other form of temporal content.

While only a few basic examples are given here, one of skill in the art will appreciate from the present discussion that space-based positional constraints extend to a wide variety of constraints dealing with requirements that symbols be horizontally overlapping or non-overlapping, or requirements that symbols have a certain amount of "padding" purely intended to create visually convenient and easy-to-read layouts.

For purposes of further illustration, several concrete examples of time-based positional constraints also are provided. All examples are taken from Western notation. As a class of examples, time-based positional constraints can include the particular ordering and placement of symbols based on their temporal occurrence within musical time. The order of occurrence can be one of musical simultaneity or staggering. For example, Western music notation requires that two notes occurring at different times be spaced a preferred distance apart so as to indicate that the two notes occupy distinct horizontal positions. As an additional example, Western music notation also dictates that two notes in different staves that occur simultaneously (i.e., that lie on the same beat of the same measure but are in two different staves) should be given the same horizontal position (i.e., they should be vertically aligned). This positioning requirement results in the time-based positional constraints that each of the two notes be spaced a preferred distance to the right of its preceding symbols so as to align the two notes vertically, thus indicating their musical simultaneity. These examples demonstrate that time-based positional constraints may operate between any symbols within a measure, including symbols within the measure that lie in different staves.

As an additional example taken from Western music notation, a time-based positional constraint also can impose preferred distances between two symbols based on how far apart the two musical events represented by the two symbols are displaced in metric time. Such constraints can involve two symbols in the same staff or two symbols in different staves. For example, consider a measure containing one staff that is in 4/4 time and is filled by a half note followed by two quarter notes. The measure is enclosed by a bar line at its left and right ends. Conventions of Western music notation dictate that since the metric or temporal duration of the half note is greater than the metric or temporal duration of either of the two quarter notes, the distance between the half note and the first quarter note should be greater than the distance between the first quarter note and the second quarter note. Such preferred distances indicate whether more or less time is passing relative to the time duration represented by other visual space. Said differently, one example time-based positional constraint represents the requirement that longer time intervals correspond to greater amounts of visual separation between symbols.

In accordance with embodiments of the present invention, a constraint graph can be partitioned into time-based positional constraint subgraphs and space-based positional constraint graphs, as previously described herein. For implementations directed to Western music notation, this allows, among other benefits, the space-based positional constraints for a staff within a measure to be segregated from 1) space-based positional constraints belonging to symbols on other staves, and 2) time-based positional constraints, which by their nature may apply to symbols across different staves. This is a notable feature, since it can allow the space-based positional constraint subgraph for a staff to remain unaffected by all changes that do not alter the staff's Musical content. Thus, in contrast with existing systems implemented for Western music notation, a single point change to musical content (e.g. a change in one note) of some measure need only result in reconstruction of the space-based positional constraints for the affected staff and the time-based positional constraints for all staves. Said differently, if a space-based positional constraint is used to determine the distance at which an additional symbol is placed away from an existing symbol, then the space-based positional constraint is based on the location or presence of a symbol that is in the same staff where the additional symbol has been placed, will be placed, or has been instructed to be placed. Furthermore, if a time-based positional constraint is used to determine the distance at which the additional symbol is placed away from an existing symbol, then the time-based positional constraint is based on the location or presence of a symbol that is in the same measure as the additional symbol.

In accordance with further aspects of the present invention, a set of numerical weights can be used to multiply the values or quantities (i.e. the preferred distances) that are specified by the positional constraints. For embodiments implementing these values as nodes of a constraint graph having a time-based subportion and a space-based subportion, the weights affect values of the vectors between the nodes contained in the two subgraphs. Furthermore, each subgraph can have its own value for weighting (e.g. by multiplying) all of the nodes contained therein. As such, the weights optionally can be separately adjustable for each subgraph, such that the vectors of nodes corresponding to time-based positional constraints receive a different weight from vectors of nodes corresponding to space-based positional constraints. These weights can have the effect of expanding or compressing the distances or vectors that ultimately determine the amount of separation between musical symbols on a page, display, or document. In some embodiments, a weight of unity (i.e. a value equal to 1) represents "ideal" gap sizes, with smaller values of weights resulting in the proportional decrease of the gap sizes and larger values of weights resulting in the proportional increase of the gaps. In general, and as appreciated by one having skill in the art, weights of unity are considered ideal since visual appeal is maximized when both the time-based weight and the space-based weight are equal to 1. For a single graph, adjusting the time-based subgraph weight and the space-based subgraph can generate a family of valid layouts of semantically identical musical content. Additionally, such changes in the weights can result different preferred distances being selected by max, min, and sum nodes. For example, assigning a time-based subgraph weight of 0.01 and a space-based subgraph weight of 1 will likely result in space-based positional constraints dominating the graph calculations and the distances that are selected by the nodes. In this manner, changing the weights can alter whether a graph is dominated by space-based distances or time-based distances.

In accordance with further embodiments of the present invention, each symbol's position in the layout can be a differentiable, piecewise-linear function of its two weighted values. Consequently, for each node's layout vector, the illustrative embodiment is able to calculate not only the vector's position but also its partial derivative with respect to each weight parameter. The availability of these derivatives permits the use of iterative numerical techniques such as Newton's Method to solve for a particular value of each weight that yields a specific vector at some given node, to any desired degree of accuracy. This approach thus provides a very simple and efficient means of justifying the musical layout of a system (i.e. causing a system to occupy the desired layout width, e.g. a full page width). For example, one can adjust the weights until a node representing the rightmost edge of the system achieves a position equal to the page width inset by the right margin. Using Newton's method, the process converges on the desired width by alternately increasing and decreasing weights, and takes two or three iterations at most to reach sub-pixel accuracy.

For optimal results, this task (and in general, any task involving adjusting the weights) can be performed by preferentially adjusting time-based subgraph weights rather than space-based subgraph weights. Generally, adjusting the space-based weight has greater negative impact on the readability of the music than does adjusting the time-based weight. Said differently, adjusting the time-based subgraph weight is the most visually appealing way to lengthen/stretch or shorten/squash music to make it fit the page. In Western music notation, good engraving practice allows for time-based positional constraints to be changed within a wide range without substantially affecting readability. On the other hand, since space-based positional constraints tend to require minimum amounts of visual padding between glyphs, lowering the space-based subgraph weights decreases the minimum padding, which can disturb readability.

In accordance with one illustrative embodiment of the present invention that is described in further detail herein, the layout constraint graph is situated within the application in a family of data structures that are distinct from both 1) the data structures representing the notes, measures, staves, etc. of the musical document itself (the "model objects"), and 2) the data structures representing the actual visual objects seen on the computer display or rendered on a printed page (the "view objects"). This separation can deliver significant benefits. In the first case, the topology of the constraint graph is very different from the model objects whose positions it represents, so the use of distinct data structures frees the constraint graph to express a complex web of visual relationships without needing to simultaneously represent the hierarchies and sequences that organize the musical data. In the second case, view objects (which are typically expensive in terms of computation and memory) are free to exist or not, independently of the constraint graph, which permits them to be selectively created and destroyed on an as-needed basis, even while the document's geometry is described in full by an in-memory constraint graph.

According to one example embodiment of the present invention, a computer-implemented method for positioning, on an electronic display, an additional musical symbol based on the location of one or more existing musical symbols can include determining one or more positional constraints on the additional musical symbol. The one or more positional constraints can include one or more preferred quantities. Each of the one or more positional constraints can be automatically defined as being either a time-based positional constraint or a space-based positional constraint. The additional symbol can be positioned in a measure of a staff at a distance away from one of the one or more existing musical symbols. The distance can be at least in part determined by at least one of the one or more preferred quantities. If a space-based positional constraint of the one or more positional constraints is used to determine the distance, then the space-based positional constraint can be based on the location of a symbol of the one or more existing symbols in the staff. If a time-based positional constraint of the one or more positional constraints is used to determine the distance, then the time-based positional constraint can be based on the location of a symbol of the one or more existing symbols in the measure.

According to further aspects of the present invention, the one of the one or more existing symbols can immediately precede the additional musical symbol on the staff. Furthermore, the distance can be a maximum distance, a minimum distance, or a summation distance. One or more staves can contain the additional musical symbol and the one or more existing symbols.

According to further embodiments of the present invention, a directed acyclic graph can be constructed and can include one or more nodes. Each of the one or more nodes can correspond to one of the one or more positional constraints, such that each of the one or more nodes is either a time-based node or a space-based node. One or more vector quantities can be assigned to each of the one or more nodes, and each of the one or more vector quantities can correspond to one of the one or more preferred quantities. One or more first weights can be used to adjust the vector quantities associated with only time-based nodes of the one or more nodes, and one or more second weights can be used to adjust the vector quantities associated with only space-based nodes of the one or more nodes. The graph can be used to construct a plurality of view objects depicting a plurality of glyphs positioned at relative and absolute positions dictated by the graph.

According to additional embodiments of the present invention, a computer-readable storage medium can include an executable program stored thereon, and the program can contain instructions to execute steps for positioning an additional musical symbol based on the location of one or more existing musical symbols. The steps can include determining one or more positional constraints on the additional musical symbol, and the one or more positional constraints can comprise one or more preferred quantities. The steps can further include automatically defining each of the one or more positional constraints as being either a time-based positional constraint or a space-based positional constraint. The steps can further include positioning the additional symbol in a measure of a staff at a distance away from one of the one or more existing musical symbols. The distance can be at least in part determined by at least one of the one or more preferred quantities. If a space-based positional constraint of the one or more positional constraints is used to determine the distance, then the space-based positional constraint can be based on the location of a symbol of the one or more existing symbols in the staff. If a time-based positional constraint of the one or more positional constraints is used to determine the distance, then the time-based positional constraint can be based on the location of a symbol of the one or more existing symbols in the measure.

According to further aspects of the present invention, the one of the one or more existing symbols can immediately precede the additional musical symbol on the staff. Furthermore, the distance can be a maximum distance, a minimum distance, or a summation distance. One or more staves can contain the additional musical symbol and the one or more existing symbols.

The steps can further include constructing a directed acyclic graph that includes one or more nodes. Each of the one or more nodes can correspond to one of the one or more positional constraints, such that each of the one or more nodes is either a time-based node or a space-based node. The steps can further include assigning one or more vector quantities to each of the one or more nodes, and each of the one or more vector quantities can correspond to one of the one or more preferred quantities. The steps can further include using one or more first weights to adjust the vector quantities associated with only time-based nodes of the one or more nodes, and using one or more second weights to adjust the vector quantities associated with only space-based nodes of the one or more nodes. The steps can further include using the graph to construct a plurality of view objects depicting a plurality of glyphs positioned at relative and absolute positions dictated by the graph.

According to additional embodiments of the present invention, a music notation editor based system can include a music notation editor software application operating on a computer device having a processor. The music notation editor software application can include a layout manager. The music notation editor software application can include one or more positional constraints that include one or more preferred quantities. Each of the one or more positional constraints can be automatically defined as being either a time-based positional constraint or a space-based positional constraint. The music notation editor software application can further include a controller configured to receive edits to the musical document. The music notation editor software application can further include a musical interpreter. The synthesizer can be configured to play back temporal musical events produced by the musical interpreter.

According to further embodiments of the present invention, the system can further include a directed acyclic graph. The directed acyclic graph can include one or more nodes, and each of the one or more nodes can correspond to one of the one or more positional constraints, such that each of the one or more nodes is either a time-based node or a space-based node. The graph can include one or more vector quantities associated with the one or more nodes, and each of the one or more vector quantities can correspond to one of the one or more preferred quantities.

According to further aspects of the present invention, the system can include one or more first weights configured to adjust the vector quantities associated with only time-based nodes of the one or more nodes, and one or more second weights configured to adjust the vector quantities associated with only space-based nodes of the one or more nodes. The music notation editor software application can further include a plurality of view objects depicting a plurality of glyphs positioned at relative and absolute positions dictated by the graph. Additionally, the music notation editor software application can further include a musical interpreter, a plurality of model objects, and a glyph library.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
FIG. 1 is an illustration of a conventional example of published music in the print medium.

An illustrative embodiment of the present invention relates to the placement of symbols in a musical composition using conventional Western music notation. There are important rules of notation concerning the visual placement of these musical symbols. Multiple rules often conflict, in which case a musical symbol must be placed to satisfy the more important rule of the conflicting rules. The illustrative embodiment achieves this placement of musical symbols through a computationally efficient method and system involving the separation of time-based positional constraints upon a symbol's placement from positional constraints upon the symbol's placement. This segregation can enable faster rendering, positioning, and repositioning of musical symbols within an electronic document.

Oftentimes multiple positional requirements impose positional constraints upon the placement of a single musical symbol. When the two conventions or rules differ, additional techniques govern how to resolve such conflict. In Western music notation, the additional techniques that resolve conflict generally dictate that either the largest or the smallest of the conflicting distances (depending on the scenario) should be used. Such method for resolving multiple conflicting rules for some musical symbols can therefore be resolved into two approaches: one in which the rules prescribing the largest distance from some adjacent object is applied, and an alternative in which the rule prescribing the smallest distance from some adjacent object is applied. The positioning requirement that ultimately determines the distance at which a symbol is placed is herein defined to be a "higher priority" positioning requirement. Positioning requirements that are not used to determine or calculate the distance at which a symbol is placed are deemed "lower priority" positioning requirements. Therefore, whether a positioning requirement is higher priority or lower priority can change from scenario to scenario. When two rules both determine the position of a musical symbol (e.g. because they specify the same preferred and maximum distance at a max node having three inputs), they are both considered "higher priority," as defined herein. Furthermore, there need not be a lower priority positioning requirement in order for a higher priority positioning requirement to exist in a given scenario. Even when there is only one spatial constraint governing the placement of a note, this sole spatial constraint is herein defined to be a "higher priority" spatial constraint since it determines the actual distance at which the note is placed.

While some specific examples of time-based and space-based positional constraints are provided herein, one of skill in the art will appreciate that the specific rules of any given music notation system or paradigm can be organized into time-based and space-based positional categories, based on the definitions and description provided herein. The specific rules and conventions of a particular notation system are well-known in the art and thus need not be described in further detail herein. Furthermore, the specific rules of such systems are not explicitly enumerated since the present invention enables categorization of any positioning requirements into time-based and space-based positional constraints, as would be understood by one having skill in the art upon reading the present specification. Particular types of symbols, or symbols defined by particular types of notational scenarios, can be categorized as adhering to one of three example types of output nodes, sum, min, and max. The illustrative embodiment recognizes that these three example types of nodes can fully represent the rules of Western music notation aimed at resolving different preferred distances imposed by different positioning requirements. Said differently, the specific designation that a node receives is based on the manner in which the particular notational system resolves two or more conflicting rules. The node designation determines how multiple inputs are evaluated at a node.

The illustrative embodiment can be implemented with any type of music notation system, regardless of the specific rules of that system. All that is needed is a classification of the particular rules of the desired notation system. Implementing the illustrative embodiment with a different notation system is a matter of 1) choosing a type of symbol or type of scenario in which a symbol can be found, 2) defining all of the positioning requirements dictated by the notational system for that particular symbol or scenario, 3) defining each of the positioning requirements to be a positional constraint and assigning each positional constraint as being space-based or time-based, 4) assigning a node to each of the defined positional constraint and assigning each node its appropriate value, quantity, or vector, based on the preferred distance of separation dictated by its corresponding positioning requirement, and 5) assigning each node a designation (e.g. max, min, or sum) based on how its inputs would be determined in order to properly evaluate which inputs are highest priority, such that all rules are represented by nodes and that the most important rule or convention is always satisfied.

For example, consider an example implementation of this process in Western music. Following step one, the example symbol of concern is an accidental. Second, the rules of Western notation dictate that (a) an accidental must be placed to the left of the note it defines, (b) an accidental cannot be overlapping with the note it defines, and (c) an accidental must be placed at a predetermined, relatively small distance to the left of the note it defines. Given that rule (c) encompasses rules (a) and (b), rule (c) alone can implemented. Third, rule (c) is a space-based positional constraint. Fourth, rule (c) dictates that the preferred distance is an arbitrarily selected value of 1 layout unit (the actual value must be assigned relative to the other assigned values and preferred distances as appreciated by one having skill in the art). Fifth, the rules of Western music notation dictate that accidental be placed a preferred distance away from any symbol that it precedes, regardless of whether additional symbols are placed between it and the note it defines. Thus, the node for an accidental is designated a sum node, whose inputs include a node for the position of the symbol that it defines/precedes and a node representing the 1-layout-unit-distance. Similarly, this process can be repeated for any symbol or scenario from any music notation system, in order to implement the illustrative embodiment.

It should be noted that the terms "placing" and "positioning" are used somewhat interchangeably herein. In addition to their well-understood definitions within the context of placing musical symbols in an electronic document, these terms also include the sense of re-placing, re-positioning, and re-rendering a symbol. Said differently, "placing" a symbol includes both placing the symbol for the first time, as well as re-spacing distances defining the symbol's location subsequent to changes or edits made the document by a user.

As discussed previously, a symbol's position can be defined according to a number of different methods. One convention implemented herein is to define symbols' positions according to a distance away from a preceding symbol located within the same staff (for Western music notation implementations). Alternatively, the distance can be defined with respect to a subsequent or following symbol. Such a distance, regardless of its origin, can be one of three types: a summation distance, a maximum distance, or a minimum distance. These three types of distances correspond to the three types of nodes: a sum node, a max node, and a min node, respectively. In particular, a summation distance satisfies the requirements of a sum node, a minimum distance satisfies the requirements of a min node, and a maximum distances satisfies the requirements of a max node. Said differently, a maximum distance is the greatest value of distance at which a symbol can be placed, among all values imposed by the various positional constraints. A minimum distance is the smallest value of distance among all values of distance imposed by the various positional constraints.

A summation distance is the sum of a specified distance and the position of another symbol. For summation distances, the specified distance can be received as an input distance from another node, or it can be pre-assigned based on the type of symbol to which it corresponds. For example, accidentals are assigned a particular pre-determined distance at which they will be placed relative to the node to which they input the pre-determined distance.

Additionally, it should be noted that the terms "musical symbol" and "symbol" are used somewhat interchangeably herein. Both terms refer to any diagrammatic or illustrative representation that can be used to visually depict some form or aspect of music or musical content. For example, in Western music notation, symbols can include notes, note heads, note stems, chords, chord symbols, chord frames, guitar tablature, rests, dots, flags, beams, clefs, clef changes, multiple staves, key signatures, time signatures, instrumental labels, textual labels or other textual/numerical/graphical instructions, grace notes, repeats, slurs, ligature, glissandos, ledger lines, measure lines, lyrics, as well as a wide range of other symbols not explicitly mentioned here.

The illustrative embodiment of the present invention approaches the problems in the art by creating a form of bookkeeping system in a computer's memory, in which the position of each note is represented by a single entry in the system. Entries are uniquely identified by their memory location in the computer. Such a bookkeeping entry may either define a visual spacing in terms of an arbitrary unit (e.g., "10 spaces"), or may refer to other entries to indicate a relative position (e.g., "5 spaces to the right of the position in entry A"), or may refer to other entries to indicate the leftmost or rightmost of their positions (e.g., "the rightmost of the positions in entries B, C, and D"). In general, the entries concerning relative positions indicate notation rules, and the entries concerning leftmost and rightmost positions indicate how to resolve a conflict between rules. The illustrative embodiment is thus built such that the entry of each note yields the proper visual position for the note, accounting for all notation rules and possible conflicts by means of the references to other entries in the system, which themselves may refer to other entries, and so on. Finally, the visual distance represented by a "space" may be changed at will, say from 10 millimeters to 5 millimeters, which causes the same bookkeeping system to yield a different set of results for the note positions without altering the system or its entries in any way.

In the description provided herein, the above bookkeeping system is described differently, and in terms that can be related to common terms of art in computer science. One of skill in the art will appreciate that there are multiple different ways to accomplish the same basic functionality described herein. Accordingly the present invention contemplates all such variations and implementations that are understood to be equivalents to those possessing skill in the art. Accordingly, the illustrative embodiment can utilize a type of graph with entries being nodes and references between entries being arcs. Because the illustrative embodiment constrains the position of notational symbols, the graph can be further labeled as a form of constraint graph. As previously described, portions of the graph (or subsets of the entries in the system) are referred to as subgraphs. The changes to units such as "space" are affected by means of multiplicative factors known as weights. One of skill in the art will appreciate that the conventional computer science terminology utilized herein in an effort to describe the illustrative embodiments (e.g., graph, node, arc, constraint graph) merely construct a framework around the operation of the illustrative embodiment in terms that may be recognizable by those of skill in the art. However, the present invention is by no means limited to the conventional definitions of these terms. Rather, the present invention, while able to be described within such a framework of terms, provides substantial differences and innovations as described throughout herein, which go beyond that of the conventional language of the graph framework and are related to assigning constraints as being space-based or time-based.

FIGS. 2 and 4 through 8, wherein like parts are designated by like reference numerals throughout, illustrate an example embodiment of the interactive music notation and editing system according to the present invention. Although the present invention will be described with reference to the example embodiments illustrated in the figures, it should be understood that many alternative forms can embody the present invention. One of skill in the art will additionally appreciate different ways to alter the parameters of the embodiments disclosed in a manner still in keeping with the spirit and scope of the present invention.

Figure 2:
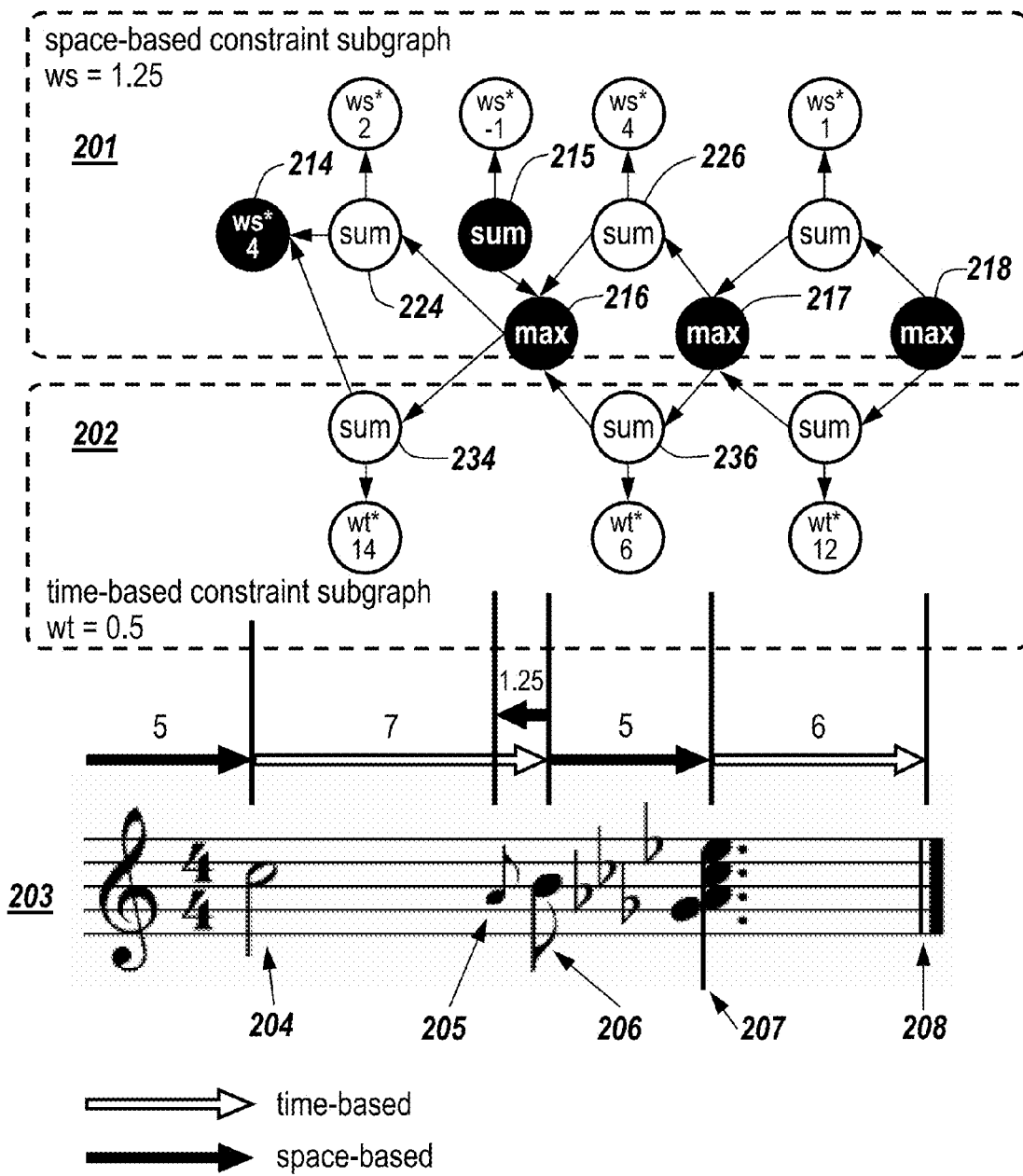
FIG. 2 is an illustration of a single measure of conventional music accompanied by a directed acyclic graph of constraints that describe its layout.

In the following example, positional constraints are referred to and expressed according to the preferred quantity/distance of separation that they impose. FIG. 2 illustrates a single measure 203 of conventional music notation on a single staff, accompanied by a constraint graph with a space-based positional constraint subgraph 201 and a time-based positional constraint subgraph 202. The notes in the musical example 204-208 are positioned by the vectors generated for the corresponding nodes in the constraint graph 214-218, which are shown as solid black circles to highlight this correspondence.

The construction of such a constraint graph from the notational information may easily be generated by means familiar to those of skill in the art. One approach to constraint graph creation is to iterate through a list of the musical symbols in each staff, applying various positioning heuristics to create the appropriate space-based positional constraint nodes and arcs for each pair of adjacent symbols. A subsequent iteration through symbols in all staves can separately generate the time-based positional constraint nodes, reflecting the simultaneity or time displacement of musical events.

The graph generates the spacings shown in the music notation in the following manner. Node 214 generates the position of the first note in the measure 204, which is "ideally" spaced 4 layout units from the left edge of the measure (to make room for the symbols to its left). However, the space-based positional weight for the graph is set to 1.25, which has the effect of inflating all space-based positional constraints. Thus, while the node specifies 4 units, the actual vector generated for the node is 4 multiplied by 1.25, which yields 5 units in the actual layout. Such an approach determines the position of the first note.

Node 216 represents the next non-grace note in the measure, note 206. It is connected to node 214 by two paths: the upper path travels via a "sum" node 224 which adds a weighted space-based positional constraint of 2*1.25=2.5 to the previous note's position, while the lower path is connected to the "sum" node 234 which adds a weighted time-based positional constraint of 14*0.5=7 to the previous note's position. Because 216 is a "max" node, its vector is the larger of the vectors at nodes 224 and 234, which turns out to be the time-based positional constraint adding 7 layout units to the previous note's position for a total position of 12 units from the start of the measure.

The modular arrangement of nodes 214, 224, 234 and 216 illustrates basic unit of layout graph computation, in which space-based positional and time-based positional constraints are compared and the largest constraint ultimately determines a symbol's position. Because the weights ws and wt may be varied at will, it is not possible to know at the time of the graph's construction which constraint is actually the largest. Weights may be adjusted after the graph is built in order to justify music to fit a required page width.

Node 215 determines the position of the grace note 205, whose position should be located a predetermined spacing to the left of note 206. It is therefore a "sum" node that adds a negative space-based positional constraint of −1*1.25=−1.25 units to note 206, resulting in an overall position for the grace unit of 10.75 units from the start of the measure.

Node 217 determines the position of the chord 207. It is connected to node 216 by two paths: the upper path travels via a "sum" node 226 which adds a weighted space-based positional constraint of 4*1.25=5 to the previous note's position, while the lower path is connected to the "sum" node 236 which adds a weighted time-based positional constraint of 6*0.5=3 to the previous note's position. 217 is a "max" node, so its vector is the larger of the two input vectors, the space-based positional constraint for node 226 adding 5 layout units to the previous note's position for a total position of 17 units from the start of the measure. It is noteworthy that the space-based positional constraint dominates the time-based positional constraint in this case because of the accidentals associated with the chord 207, which require a larger than normal spacing between the notes.

Node 218 determines the position of the barline 208 and is related to node 217 in the same way as nodes 216 and 214. The time-based positional constraint of 12*0.5=6 layout units exceeds the space-based positional constraint. Accordingly, the layout vector for the barline 208 lies 6 layout units to the right of that for the chord 207, yielding the full width of the measure, 28 layout units.

Figure 3:
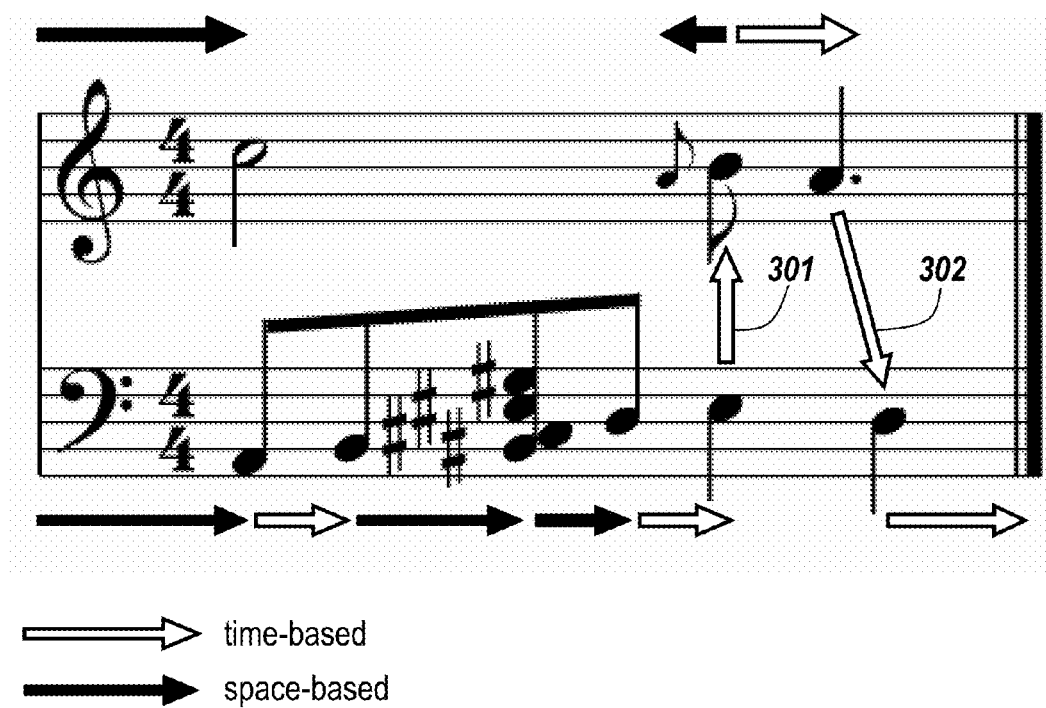
FIG. 3 is an illustration of a more complex conventional measure of music with multiple staves, showing the results of its constraint graph's evaluation using standard weight parameters.

FIG. 3 displays the constraint relationships applied in a more complex measure of music containing two staves. The constraint graph is not shown for purposes of clarity. In this diagram, the weights ws and wt have been set to unity. The arrows in this diagram depict the layout relationships generated by the graph, only including those that yield the largest input of a "max" node and thus succeed in determining the graph. As depicted in FIG. 3, there is a mixture of space-based positional and time-based positional constraints. In particular, the cross-staff time-based relationships 301 and 302 which cause notes to be vertically aligned or displaced, should be noted.

Figure 4:
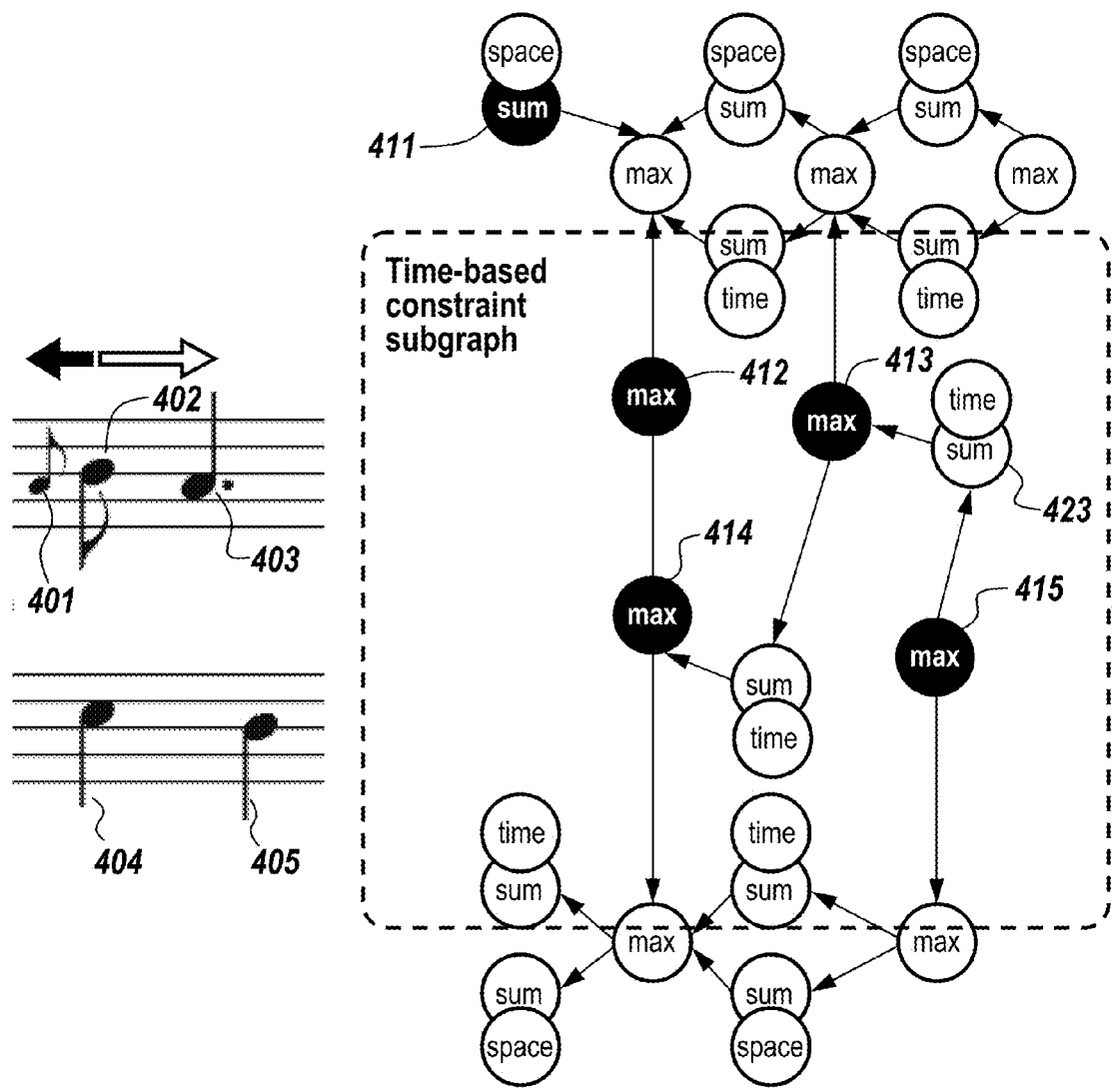
FIG. 4 is an illustration of a subset of the music from FIG. 3, accompanied by a constraint graph showing how multiple staves are reflected in the graph's nodes and arcs.

FIG. 4 displays the last four notes of this same two-staff measure, and also shows the time-based constraint subgraph that determines the relative positions of each note. The positions of notes 401-405 are determined respectively by graph nodes 411-415. The upper and lower regions of the graph are similar or identical to the graph shown in FIG. 2, but the presence of two staves means that a number of additional connections must be made to reflect the time-based relationship between the staves. The new "max" nodes 412 and 414 ensure that the simultaneous notes 402 and 404 both appear at the rightmost of the positions that either note would have if its staff was considered alone, causing them to be vertically aligned. The "max" node 413 positions the note 403 at the correct time-based relationship to notes 402 and 404 (reflecting the fact that it occurs one eighth note later), but since both positions are the same, this has no effect. The "max" node 415 ensures that note 405 is displaced relative to note 403 via the time constraint expressed by node 423, pushing it to the right of the position it would have had if only its intra-staff relationship to note 404 were considered.

Figure 5:
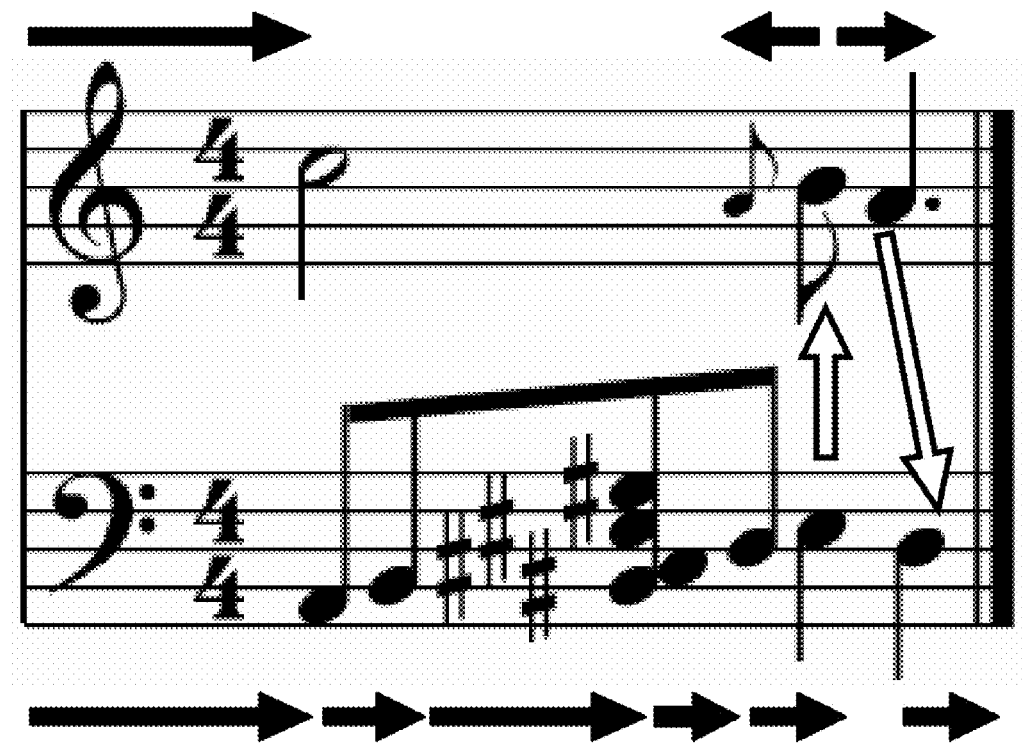
FIG. 5 is an illustration of the measure of music shown in FIG. 3, but with a decreased time-based subgraph weight parameter.
Figure 6:
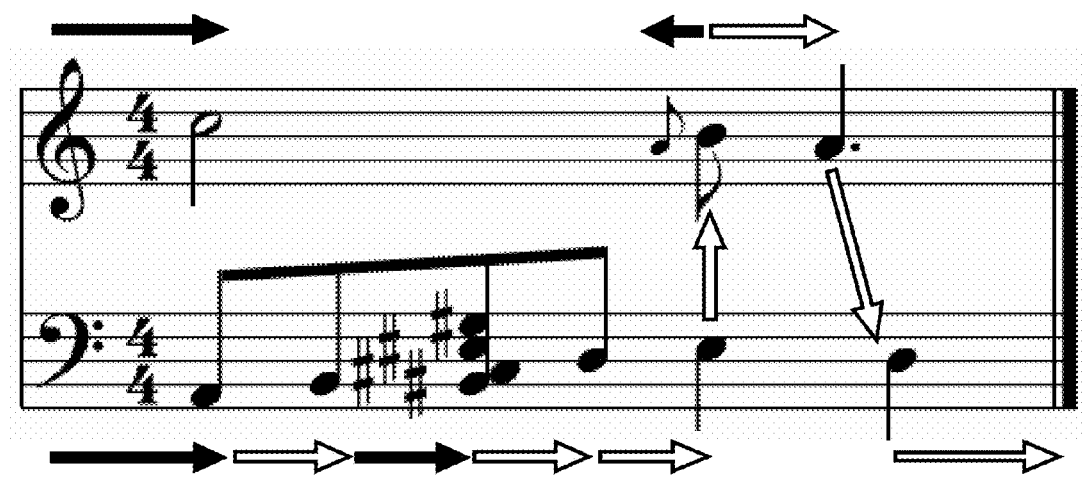
FIG. 6 is an illustration of the same measure of music shown in FIG. 3, but with an increased time-based subgraph weight parameter.

FIG. 5 and FIG. 6 depict two extremes of adjustment to the weights controlling the evaluation of a constraint graph. Together with FIG. 3, these figures illustrate the range of layouts that can be derived from a single graph, and serve to show how different such layouts can be: the various layouts are not related to each other by a simple proportional adjustment, since changing the weights causes different pathways in the constraint graph to dominate the result of the "max" nodes. Said differently, choosing a first set of weights may cause a max node to select a preferred distance of a time-based constraint. If the first set of weights is then changed to a second set of weights, this may cause the max node to select a different preferred distance. Notably, the different preferred distance may no longer correspond to a time-based constraint. Rather, it may correspond to a space-based constraint. However, despite their differences, all three layouts of FIGS. 3, 5, and 6 are musically correct. In FIG. 5, the time-based subgraph weight is almost zero and thus the space-based positional constraints in the constraint graph dominate the selections of the nodes, with the exception of cross-staff relationships. In FIG. 6, the time-based subgraph weight is near a value of 2, and thus time-based positional constraints dominate the selections of the nodes, with the exception of relationships that have nothing to do with time (e.g. the grace note's position).

The present description of the illustrative embodiment herein has focused on constraint graphs within the narrow context of musical layout. In an illustrative embodiment providing the full functionality of a notation editor, however, other components are necessary and must cooperate with the constraint graph system to deliver the features expected by users of music notation editors.

Figure 7:
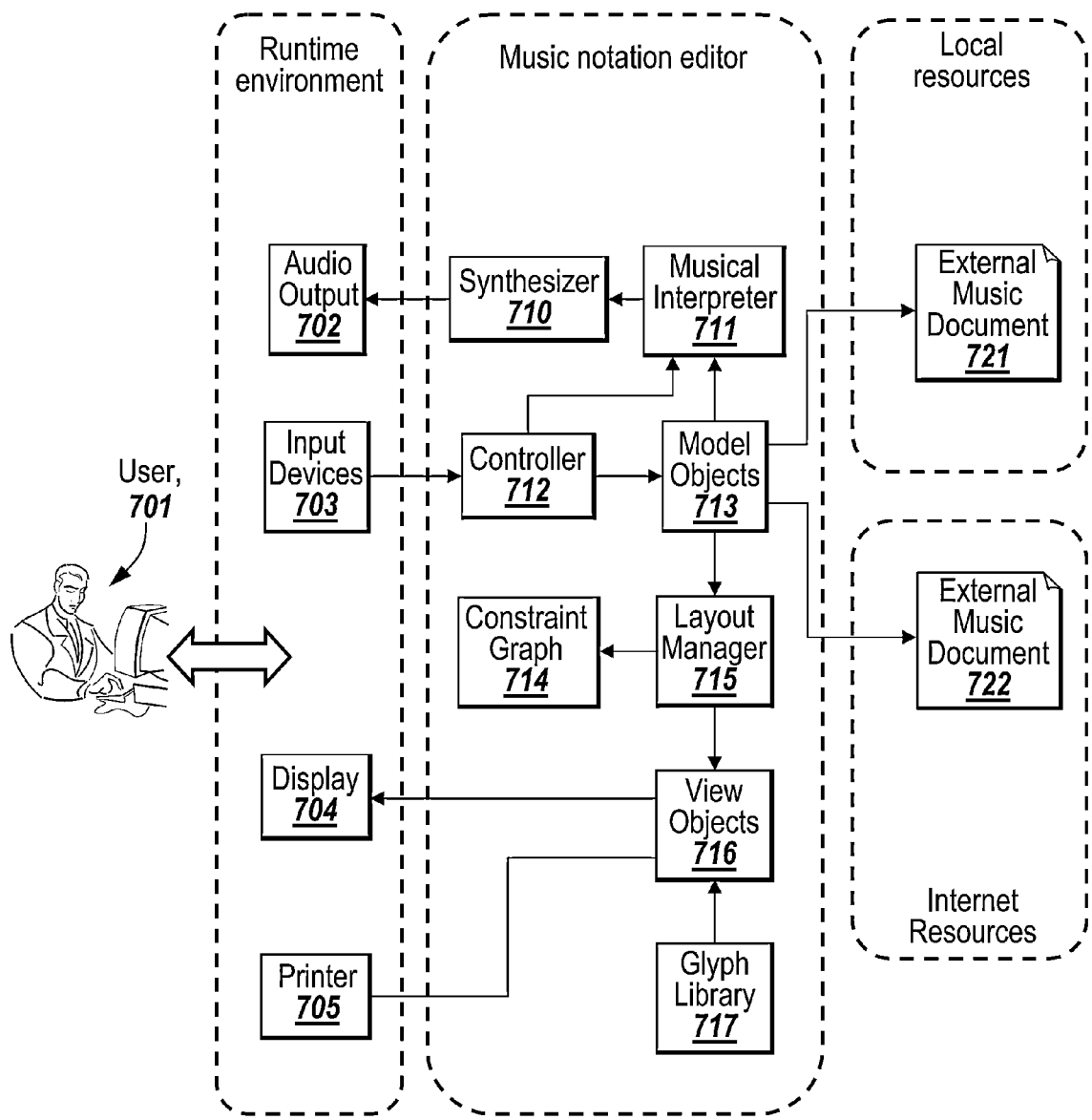
FIG. 7 is an illustration of a schematic diagram depicting a music notation editing application according to example embodiments of the present invention.

FIG. 7 illustrates the components that jointly make up an embodiment of the invention that exhibits the full functionality of a notation editor. A user 701 invokes a notation editor application within a software runtime environment such as a web browser or a native operating system. The notation editor is caused to load the contents of an external music document 721 or 722, which may be in any desired compatible file format. Note that external documents may either reside locally on a computer (musical document 721), or may reside on an Internet server (musical document 722). Upon loading, the document is translated into a set of model objects 713 whose instances correspond to musical symbols in the document and whose properties describe those symbols, but not their relative or absolute layout positions. These objects are processed by a layout manager 715, which constructs the corresponding layout constraint graph 714 and uses it to manufacture a set of view objects 716 having the positions dictated by the graph, and displaying the visual glyphs for the symbols as supplied by the glyph library 717. These view objects may be displayed to the user via a computer display 704 or printed as hardcopy on a printer 705.

The above conversion process from model objects 713 to view objects 716 can be undertaken in a series of steps, as described herein for one illustrative embodiment implemented for conventional Western musical notation.

The first step is the creation of the model objects 713 as a straightforward representation of the symbolic content of a musical document, with no visual or positional information. In an example embodiment, a note may be modeled using a data structure indicating a rhythmic value (such as eighth, quarter, half), an absolute pitch and octave in equal temperament (such as C#4, A5, D#2 . . . ) a scale step (such as A, B, C, D . . . ), and other optional information such as articulation. A rest can be modeled as a pure rhythmic value, with no pitch information. A chord can be modeled as a rhythmic value accompanied by a list of pitches and scale steps.

While the above are primitive musical model objects, they can be used to hierarchically build larger objects, herein referred to as "composite model objects." Such composite model objects include measures (a list of rests, notes, chords along with textual directions, barlines, and so on); musical staves (a list of measures); and ultimately an entire score (a list of staves). The resulting hierarchy may be termed, in whole, a model of a musical score document.

The next step is the construction of the layout constraint graph 714 by a layout manager 715, working from the above model. In one example embodiment, this may be done on a measure-by-measure basis, resulting in a list of separate graphs, one for each measure of the score (but representing all parts). In this example, each graph is partitioned into a set of subgraphs. There are two kinds of subgraphs, each constructed in a separate phase: a set of space-based subgraphs, one per staff (representing required visual spacing between symbols) and the time-based subgraph spanning all staves (accounting for time-based displacement between symbols and other temporal content). During graph construction, nodes in the constraint graph retain a reference to the model object from which they were constructed, allowing this correspondence to be used in this and in subsequent steps.

In the phase of constraint graph construction pertaining to space-based content for a single measure/staff, a graph node is created representing an X offset of zero at the start of the measure and is identified as the "current node." What is meant by "X offset" is an offset in the X-axis. The X-axis represents the horizontal direction and the Y axis represents the vertical direction. This is then iterated over the list of primitive model objects for a single staff within the measure. Note that each model object within the staff represents a distinct musical symbol such as a rest, note, chord, and other musical symbols. For each symbol encountered as the "current node," a new sum node is created whose inputs are 1) the position of the current node, and 2) a spacing-weighted displacement that accounts for the visual padding required between the previous symbol and the symbol whose model object was just encountered. A new max node is also created, whose single input is the aforementioned sum node; this max node is used later in the subsequent phase of graph construction pertaining to time-based content, and is also taken as the new "current node" for the next symbol on the staff.

In the phase of graph construction related to time-based content, all of the max nodes in the above positional subgraphs are considered in a temporally sorted order. Each max node associated with a symbol that is temporally simultaneous to other symbols is replaced by a new max node, whose inputs are the max nodes for these other symbols, causing all simultaneous symbols to appear at the rightmost location required of any of them. Next, each max node associated with a symbol that is preceded by some other symbol at a non-zero time interval receives an additional input of a new sum node whose inputs are 1) the previous max node for the prior symbol, and 2) a time-weighted displacement that accounts for that time interval. Note that the rightmost symbol in a measure is the measure's barline, whose max node ultimately corresponds to the width of the entire measure.

The final step is the construction of a set of view objects 716 working from the constraint graph 714. First, a set of measures that will be displayed on a single system 101 is determined, by evaluating each measure graph's nominal width using unity weights and accumulating the sum of these measure widths until it exceeds the desired system display width. A set of weights is then determined for the system such that the sum of these widths is equal to the system's display width, within any desired error tolerance. The weight values need not be calculated directly, but may be discovered using a simple iterative technique such as Newton's method. Next, the starting X position of each measure in the system is determined from the end position of the prior measure. Finally, each max node for some musical symbol within the constraint graph is examined, along with the model object for which it was originally created, and a displayable glyph for that node's symbol is generated and placed at the X position given by that node. (Note that Y positions in conventional Western notation are generally determined by the musical symbols alone and do not require the use of the constraint graph mechanism.)

The user may edit the document by interacting with one or more input devices 703, including a mouse, a keyboard, a microphone, a MIDI device, or other hardware. These generate events intercepted by a controller 712 which makes changes to the document's model objects. These changes in turn are detected by a layout manager, causing it to immediately alter the portions of the constraint graph affected by the changes, re-evaluate it, manufacture new view objects, and update the display.

The user may also audition the document by requesting the controller to play it back. The controller can invoke the functions of the musical interpreter 711, which transforms the model objects into temporal musical events that are passed to a synthesizer 710 whose output in turn is routed to the runtime environment's audio output subsystem 702. The operation and structure of these components is known to those having skill in the art, and thus is not described in further detail herein.

The illustrative embodiment thus provides a lightweight, computationally efficient system and method for music notation layout that does not place computationally intensive demands on its host environment, and which is particularly well-suited for use in interactive editing scenarios.

Figure 8:
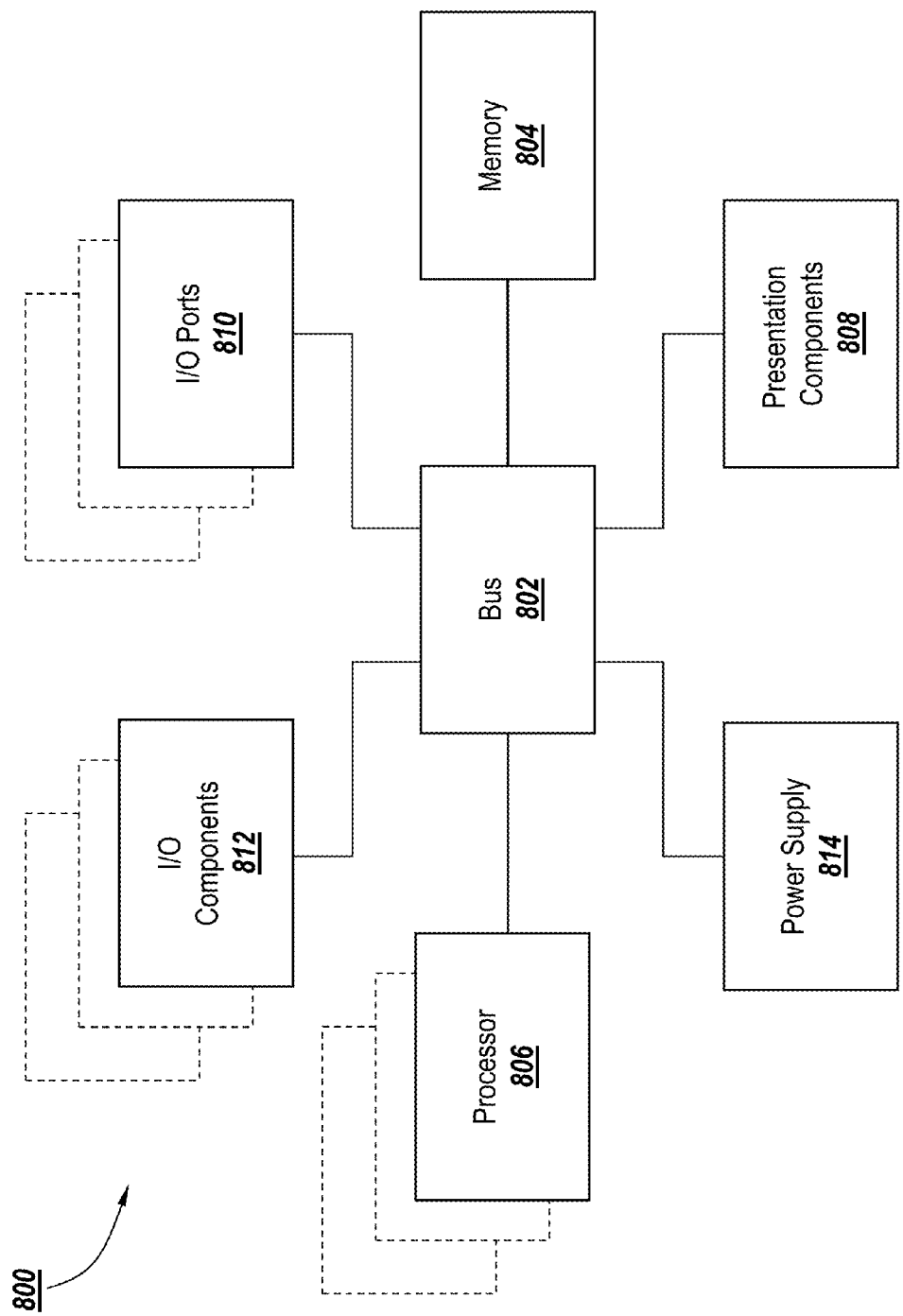
FIG. 8 is a diagrammatic illustration of an illustrative computing environment for implementing embodiments of the present invention.

Referring to FIG. 8, an exemplary operating environment for implementing the illustrative methods, systems, and the computer-readable storage medium, of the present invention is shown as a computing device 800. The computing device 800 is merely a representative example of a suitable computing environment and in no way limits the scope of the present invention. As such, a "computing device," as contemplated by the present invention and represented by FIG. 8, is first and foremost a computing device as would be known and understood by those of skill in the art, and in most instances can take the form of a "workstation", a "server", a "laptop", a "desktop", a "hand-held device", a "mobile device", a "tablet computer", or the like.

The present invention may be described in the general context of computer code or machine-useable instructions. This includes computer-executable instructions, including program modules. The computer-executable instructions can be executed by a computer or other machine, including any suitable handheld device or other known computing device. Program modules can include routines, programs, objects, components, data structures, and the like. These modules refer to code that can perform particular tasks or can implement particular data types. Embodiments of the present invention can be practiced in a wide variety of system configurations, such as general-purpose computers, consumer electronics, hand-held devices, etc. Embodiments of the present invention can also be implemented in a distributed computing environment, where tasks are performed by remote-processing devices that are linked through one or more communications network, including a cloud computing environment.

FIG. 8 illustrates computing device 800, within an exemplary operating environment for implementing illustrative methods, systems, and a computer-readable storage medium holding instructions, of the present invention. The computing device 800 is merely an illustrative example of a suitable computing environment and in no way limits the scope of the present invention. As such, a "computing device," as contemplated by the present invention and represented by FIG. 8, includes a "workstation", a "server", a "laptop", a "desktop", a "hand-held device", a "mobile device", a "tablet computer", or the like, as would be understood by those of skill in the art.

The computing device 800 can include a bus 802 that can be coupled the following illustrative components, directly or indirectly: a memory 804, one or more processors 806, one or more presentation components 808, input/output ports 810, input/output components 812, and a power supply 814. One of skill in the art will appreciate that bus 802 can include one or more busses, such as an address bus, a data bus, or any combination thereof. One of skill in the art will appreciate that in some instances, multiple of these components can be implemented by a single device. Similarly, any single component can be implemented by multiple devices. As such, FIG. 8 is merely illustrative of an exemplary computing device that can be used to implement one or more embodiments of the present invention.

The computing device 800 can include or interact with a variety of computer-readable media. For example, computer-readable media can comprises Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by computing device 800.

Memory 804 can include computer-readable storage media in the form of volatile and/or nonvolatile memory. The memory may be removable, nonremovable, or any combination thereof. Exemplary hardware devices are devices such as hard drives, solid-state memory, optical-disc drives, and the like. The computing device 800 can include one or more processors that read data from components such as a memory 804, various I/O components 812, etc. Presentation component(s) 808 present data indications to a user or other device. Exemplary presentation components include a display device, speaker, printing component, vibrating component, etc.

I/O ports 810 can allow the computing device 800 to be logically coupled to other devices, such as I/O components 812. Some of the I/O components can be built into the computing device 800. Examples of such I/O components include a microphone, joystick, synthesizer, MIDI controller, musical instrument, recording device, game pad, satellite dish, scanner, printer, wireless device, network interface or other networking devices, and other I/O components.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A computer-implemented method for positioning, on an electronic display, an additional musical symbol based on the location of one or more existing musical symbols, the method comprising:
   determining one or more positional constraints on the additional musical symbol, each positional constraint of the one or more positional constraints comprising a preferred distance away from a corresponding existing musical symbol of the one or more existing musical symbols;
   automatically defining all of the one or more positional constraints representing temporal content as being time-based positional constraints, wherein the preferred distance of any time-based positional constraint represents a temporal relationship between the corresponding existing musical symbol and the additional musical symbol;
   automatically defining all of the one or more positional constraints not representing temporal content as being space-based positional constraints, wherein the preferred distance of any space-based positional constraint does not represent a temporal relationship between the corresponding existing musical symbol and the additional musical symbol; and
   positioning the additional symbol in a measure of a staff at a distance away from one of the one or more existing musical symbols, the distance being at least in part determined by the preferred distance of one or more of the one or more positional constraints;
   wherein if a space-based positional constraint of the one or more positional constraints is used to determine the distance, then the space-based positional constraint is based on the location of a symbol of the one or more existing symbols in the staff; and
   wherein if a time-based positional constraint of the one or more positional constraints is used to determine the distance, then the time-based positional constraint is based on the location of a symbol of the one or more existing symbols in the measure.

2. The method of claim 1, wherein the one of the one or more existing symbols immediately precedes the additional musical symbol on the staff.

3. The method of claim 1, wherein the distance is a maximum distance, a minimum distance, or a summation distance.

4. The method of claim 1, wherein one or more staves contain the additional musical symbol and the one or more existing symbols.

5. The method of claim 1, further comprising:
   constructing a directed acyclic graph comprising one or more nodes, each of the one or more nodes corresponding to one of the one or more positional constraints, such that each of the one or more nodes is either a time-based node or a space-based node; and
   assigning one or more vector quantities to each of the one or more nodes, each of the one or more vector quantities corresponding to one of one or more preferred quantities.

6. The method of claim 5, further comprising using one or more first weights to adjust the vector quantities associated with only time-based nodes of the one or more nodes, and using one or more second weights to adjust the vector quantities associated with only space-based nodes of the one or more nodes.

7. The method of claim 5, further comprising using the graph to construct a plurality of view objects depicting a plurality of glyphs positioned at relative and absolute positions dictated by the graph.

8. A computer-readable storage medium with an executable program stored thereon, wherein the program contains instructions to execute steps for positioning an additional musical symbol based on the location of one or more existing musical symbols, the steps comprising:
   determining one or more positional constraints on the additional musical symbol, each positional constraint of the one or more positional constraints comprising a preferred distance away from a corresponding existing musical symbol of the one or more existing musical symbols;
   automatically defining all of the one or more positional constraints representing temporal content as being time-based positional constraints, wherein the preferred distance of any time-based positional constraint represents a temporal relationship between the corresponding existing musical symbol and the additional musical symbol;
   automatically defining all of the one or more positional constraints not representing temporal content as being space-based positional constraints, wherein the preferred distance of any space-based positional constraint does not represent a temporal relationship between the corresponding existing musical symbol and the additional musical symbol; and
   positioning the additional symbol in a measure of a staff at a distance away from one of the one or more existing musical symbols, the distance being at least in part determined by the preferred distance of one or more of the one or more positional constraints;
   wherein if a space-based positional constraint of the one or more positional constraints is used to determine the distance, then the space-based positional constraint is based on the location of a symbol of the one or more existing symbols in the staff; and
   wherein if a time-based positional constraint of the one or more positional constraints is used to determine the distance, then the time-based positional constraint is based on the location of a symbol of the one or more existing symbols in the measure.

9. The computer-readable storage medium of claim 8, wherein the one of the one or more existing symbols immediately precedes the additional musical symbol on the staff.

10. The computer-readable storage medium of claim 8, wherein the distance is a maximum distance, a minimum distance, or a summation distance.

11. The computer-readable storage medium of claim 8, wherein one or more staves contain the additional musical symbol and the one or more existing symbols.

12. The computer-readable storage medium of claim 8, wherein the steps further comprise:
    constructing a directed acyclic graph comprising one or more nodes, each of the one or more nodes corresponding to one of the one or more positional constraints, such that each of the one or more nodes is either a time-based node or a space-based node; and
    assigning one or more vector quantities to each of the one or more nodes, each of the one or more vector quantities corresponding to one of the-one or more preferred quantities.

13. The computer-readable storage medium of claim 12, wherein the steps further comprise using one or more first weights to adjust the vector quantities associated with only time-based nodes of the one or more nodes, and using one or more second weights to adjust the vector quantities associated with only space-based nodes of the one or more nodes.

14. The computer-readable storage medium of claim 12, further comprising using the graph to construct a plurality of view objects depicting a plurality of glyphs positioned at relative and absolute positions dictated by the graph.

15. A music notation editor based system, comprising:
    a music notation editor software application operating on a computer device having a processor, the music notation editor software application comprising:
        a layout manager;
        one or more positional constraints comprising one or more preferred quantities;
        a controller configured to receive edits to the musical document; and
        a musical interpreter;
        wherein the synthesizer s configured to play back temporal musical events produced by the musical interpreter;
    wherein the system is configured to automatically define all of the one or more positional constraints representing temporal content as being time-based positional constraints; and
    wherein the system is configured to automatically define all of the one or more positional constraints not representing temporal content as being space-based positional constraints.

16. The system of claim 15, further comprising a directed acyclic graph, comprising:
    one or more nodes, each of the one or more nodes corresponding to one of the one or more positional constraints, such that each of the one or more nodes is either a time-based node or a space-based node; and
    one or more vector quantities associated with the one or more nodes, each of the one or more vector quantities corresponding to one of t-I9-e-one or more preferred quantities.

17. The system of claim 16, further comprising one or more first weights configured to adjust the vector quantities associated with only time-based nodes of the one or more nodes, and one or more second weights configured to adjust the vector quantities associated with only space-based nodes of the one or more nodes.

18. The system of claim 16, wherein the music notation editor software application further comprises a plurality of view objects depicting a plurality of glyphs positioned at relative and absolute positions dictated by the graph.

19. The system of claim 16, wherein the music notation editor software application further comprises a musical interpreter, a plurality of model objects, and a glyph library.

* * * * *